(12) United States Patent
Glennon Benjamin et al.

(10) Patent No.: US 12,441,124 B2
(45) Date of Patent: Oct. 14, 2025

(54) METHOD AND SYSTEM FOR INCREASING RUB RESISTANCE

(71) Applicant: Markem-Imaje Corporation, Keene, NH (US)

(72) Inventors: Ann Elizabeth Glennon Benjamin, Epping, NH (US); Matthew Gilliam, Hillsborough, NH (US); Maxime Pelletier, Rindge, NH (US); Stewart Wayne Wilson, Clearwater, FL (US); Keith Russell Sanctuary, Alstead, NH (US)

(73) Assignee: Markem-Imaje Corporation, Keene, NH (US)

( * ) Notice: Subject to any disclaimer, the term of this patent is extended or adjusted under 35 U.S.C. 154(b) by 213 days.

(21) Appl. No.: 18/328,673

(22) Filed: Jun. 2, 2023

(65) Prior Publication Data

US 2024/0399766 A1 Dec. 5, 2024

(51) Int. Cl.
*B41J 11/00* (2006.01)

(52) U.S. Cl.
CPC ................ *B41J 11/00212* (2021.01)

(58) Field of Classification Search
CPC ...... B41J 2/442; B41J 3/407; B41J 11/00216; B41J 11/0015; B41J 2/21; B41J 3/4078; B41M 5/26; G06K 1/121; B23K 26/142
See application file for complete search history.

(56) References Cited

U.S. PATENT DOCUMENTS

| 5,774,146 A | 6/1998 | Mizutani |
| 7,104,709 B1 * | 9/2006 | Maher ................ H04N 1/00883 101/483 |
| 10,328,530 B2 | 6/2019 | Krajca et al. |
| 2004/0228985 A1 * | 11/2004 | Calland ................ G03G 7/0046 428/32.26 |

(Continued)

FOREIGN PATENT DOCUMENTS

| CN | 107138859 A | 9/2017 |
| CN | 214730896 U | 11/2021 |

(Continued)

OTHER PUBLICATIONS

China OV Laser-Jully Tao [online], "Galvo co2 laser marking machine for engraving cardboard," Nov. 18, 2020, retrieved on Dec. 20, 2023, <https://www.youtube.com/watch?v=0-HkkBmaILs>, 1 page [Video Submission].

(Continued)

*Primary Examiner* — John P Zimmermann
(74) *Attorney, Agent, or Firm* — Fish & Richardson P.C.

(57) ABSTRACT

Methods, systems, and apparatus, including medium-encoded computer program products, for a system including: a printer configured and arranged to form a symbol on a surface of a material using hot melt ink; a laser processing subsystem including a laser and an optical assembly; and electronics communicatively coupled with the printer and the laser processing subsystem, the electronics being configured to generate a laser beam from the laser and convey the laser beam, using the optical assembly, onto at least the (Continued)

hot melt ink of the symbol, thereby increasing rub resistance of the hot melt ink on the surface of the material.

21 Claims, 9 Drawing Sheets

(56) References Cited

U.S. PATENT DOCUMENTS

| | | | |
|---|---|---|---|
| 2007/0274559 A1* | 11/2007 | Depta | B41M 3/14 382/100 |
| 2009/0120309 A1* | 5/2009 | Szyszko | B41J 11/0022 101/35 |
| 2014/0063158 A1 | 3/2014 | Liu | |
| 2015/0246552 A1 | 9/2015 | Liu | |
| 2017/0144469 A1 | 5/2017 | Franken | |
| 2022/0009262 A1 | 1/2022 | Seshaiya Doraiswamy Chandrasekar | |
| 2024/0399779 A1 | 12/2024 | Glennon Benjamin et al. | |

FOREIGN PATENT DOCUMENTS

| | | |
|---|---|---|
| EP | 3481637 | 8/2022 |
| EP | 4238689 | 9/2023 |
| JP | 2010100011 A | 5/2010 |
| JP | 5674091 B2 | 2/2015 |
| JP | 2020175512 A | 10/2020 |
| WO | WO 2017203219 A1 | 11/2017 |

OTHER PUBLICATIONS

Macsa ID, S.A. [online], "Fiber laser marking a Datamatrix Code on Aluminum for the automotive market, by Macsa ID," Feb. 13, 2014, retrieved on Dec. 20, 2023, <https://www.youtube.com/watch?app=desktop&v=3YMACq52n6A>, 1 page [Video Submission].

Macsa ID, S.A. [online], "Marking QR codes directly onto cardboard with laser—Macsa id Success Story," Mar. 3, 2020, retrieved on Dec. 20, 2023, <https://www.youtube.com/watch?v=xEI_cDB12TA>, 1 page [Video Submission].

Solaris Laser, "Trial Report," IKEA, Sweden, Jul. 23, 2013, 3 pages.

Solaris Laser, "Trial Report," Matthews, FR, Jul. 23, 2013, 2 pages.

CajoTechnologies.com [online], "Solutions for Packaging Industry," available on or before Jan. 17, 2022, retrieved on Jun. 2, 2023, retrieved from URL<https://cajotechnologies.com/solutions/solutions-for-packaging-industry/>, 7 pages.

Thunder Laser USA, "How Burning and Scorching When Laser Cutting," retrieved on Oct. 4, 2021, retrieved from URL<https://www.thunderlaserusa.com/preventing-burning-when-laser-cutting/>, 5 pages.

Extended European Search Report in European Appln No. 24179302.5, dated Oct. 31, 2024, 9 pages.

* cited by examiner

METHOD AND SYSTEM FOR INCREASING RUB RESISTANCE

BACKGROUND

Retailers and shipping companies utilize labels on packages, e.g., "A-" or "B-grade" barcodes. Due to various factors, e.g., weather and rough handling, ink in printed labels can rub away from its intended location, thereby reducing the quality of the label.

SUMMARY

This specification describes technologies relating to increasing rub resistance in labels printed on packages. In general, one or more aspects of the subject matter described in this specification can be embodied in one or more systems that include: a printer configured and arranged to form a symbol on a surface of a material using hot melt ink; a laser processing subsystem including a laser and an optical assembly; and electronics communicatively coupled with the printer and the laser processing subsystem, the electronics being configured to generate a laser beam from the laser and convey the laser beam, using the optical assembly, onto at least the hot melt ink of the symbol, thereby increasing rub resistance of the hot melt ink on the surface of the material.

In another general aspect, innovative aspects of the subject matter described in this specification can be embodied in methods that include actions of: printing, using a printer, a symbol formed by hot melt ink on a package; and lasing, using a laser, the symbol on the package. A rub resistance of the symbol can increase as a result of being lased.

The foregoing and other implementations can each optionally include one or more of the features described herein, alone or in combination. In particular, one implementation includes all the following features in combination.

In some implementations, the electronics are configured to control one or more parameters of the laser, the optical assembly, or both, to adjust an optical fluence of the laser beam based on the hot melt ink.

In some implementations, a wavelength of the laser is 9.3 µm, and a fluence of the laser when the laser encounters the hot melt ink of the symbol is in a range of 0.4-0.5 $J/cm^2$.

In some implementations, the electronics are configured to use a same optical fluence in both regions of the hot melt ink forming the symbol and regions of the surface outside of the hot melt ink forming the symbol.

In some implementations, the optical assembly includes a line generator configured and arranged to shape the laser beam into a line that is at least as long as the symbol along a direction perpendicular to a process direction.

In some implementations, the optical assembly includes a beam director arranged to scan a projected spot of the laser beam onto the surface of the material along a controllable path.

In some implementations, a dwell time of the laser on the hot melt ink forming the symbol is in a range of 1-30 microseconds at a power level setting that results in a fluence amount selected in accordance with a given ink formulation for the hot melt ink of the symbol.

In some implementations, a dwell time of the laser on the surface outside of the hot melt ink forming the symbol is between 14 and 16 microseconds at a power level setting that is at least 90% of the maximum power level for the laser.

In some implementations, the electronics are configured to cause the laser to lase the hot melt ink forming the symbol before lasing the surface outside of the hot melt ink forming the symbol.

In some implementations, the electronics are configured to use a first optical fluence on the hot melt ink forming the symbol and use a second optical fluence used on the surface outside of the hot melt ink forming the symbol, the first optical fluence being lower than the second optical fluence.

In some implementations, the electronics are configured to lase with the first optical fluence at least an area of the surface in which the symbol will be located, before the printer forms the symbol on the surface of the material using the hot melt ink.

In some implementations, the electronics are configured to cause the laser to lase an area of the surface in which the symbol will be located before the printer forms the symbol on the surface of the material using hot melt ink.

In some implementations, a print density of the symbol is 100 dots per inch or more.

In some implementations, lasing the symbol includes lasing an area corresponding to only the symbol.

In some implementations, lasing the symbol includes lasing an area corresponding to the symbol and an area surrounding the symbol In some implementations, lasing the symbol on the package includes lasing the symbol with a laser line that is at least as long as the symbol along a direction perpendicular to the process direction.

In some implementations, the method further includes lasing, before printing the symbol, an area of the package corresponding to where the printer prints the symbol.

Moreover, in some implementations, a non-transitory, computer-readable medium encodes instructions configured to cause the data processing apparatus to perform one or more methods, as detailed above and herein. Moreover, the system can include the computer-controlled manufacturing equipment and/or subsystem.

Particular embodiments of the subject matter described in this specification can be implemented to realize one or more of the following advantages. Lasing a printed symbol under certain conditions can increase the rub resistance of the printed symbol, which can improve the legibility and general quality of symbol even after other objects have rubbed the symbol. Increasing the rub resistance of a printed symbol can prevent unwanted effects, like the ink from a symbol rubbing onto other objects. Preventing unwanted effects, like symbol deterioration and unintentional marking of other objects, can reduce the overall cost of shipping packages. For example, symbols with low rub resistance can deteriorate to the point of becoming unreadable, causing rejection of the printed package. In addition, increased adherence may also occur due to the increase in ink diffusion into the material from the increased ink temperature during exposure to laser and subsequent optical absorption.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Treating printed symbols with lasing can improve the rub resistance of the symbols on a substrate. Treating a printed symbol with lasing can mean pre-lasing an area where the symbol will be printed and then lasing the symbol after it has been printed, or just lasing the symbol after it has been printed and optionally lasing some of the area around the ink of the symbol. For example, lasing the symbol after it has been printed using a hot melt ink causes the ink forming the symbol to remelt (become liquid again after the ink forming the symbol has solidified) and then permeate deeper into the substrate on which the symbol is printed. In some implementations, hot melt ink contains waxes, pigments, dyes, tackifiers, antioxidants, or a combination thereof.

Under the right conditions, e.g., an appropriate fluence resulting from a dwell time selected in accordance with the laser, remelting the symbol with the laser can warm the ink and cause the ink to diffuse into the substrate, while still maintaining the clarity and readability of the symbol and allowing for diffusion of the ink into the substrate. The diffusion of the ink into the substrate can increase the adherence between the ink and substrate, thereby increasing the rub resistance of the symbol. Further, while the focus of this disclosure is on hot melt inks, other types of inks can benefit from the present systems and techniques, such as phase change inks or any ink that shows an increase in rub resistance on a substrate as a result of a thermal reaction with laser energy of an appropriate fluence for the ink and the substrate. In addition, other ink delivery systems and techniques can be used, such as a thermal transfer ribbon (TTR) printer, which provides a hot melt ink on a carrier substrate delivered to the printing location.

In some implementations, lasing a printed symbol can melt the individual dots making up a symbol, causing the dots to spread out before solidifying in place. This spreading out can fill in the empty space between dots making up a symbol, thereby increasing the amount of surface area covered by the ink and increasing the apparent dot density.

Figure 1:
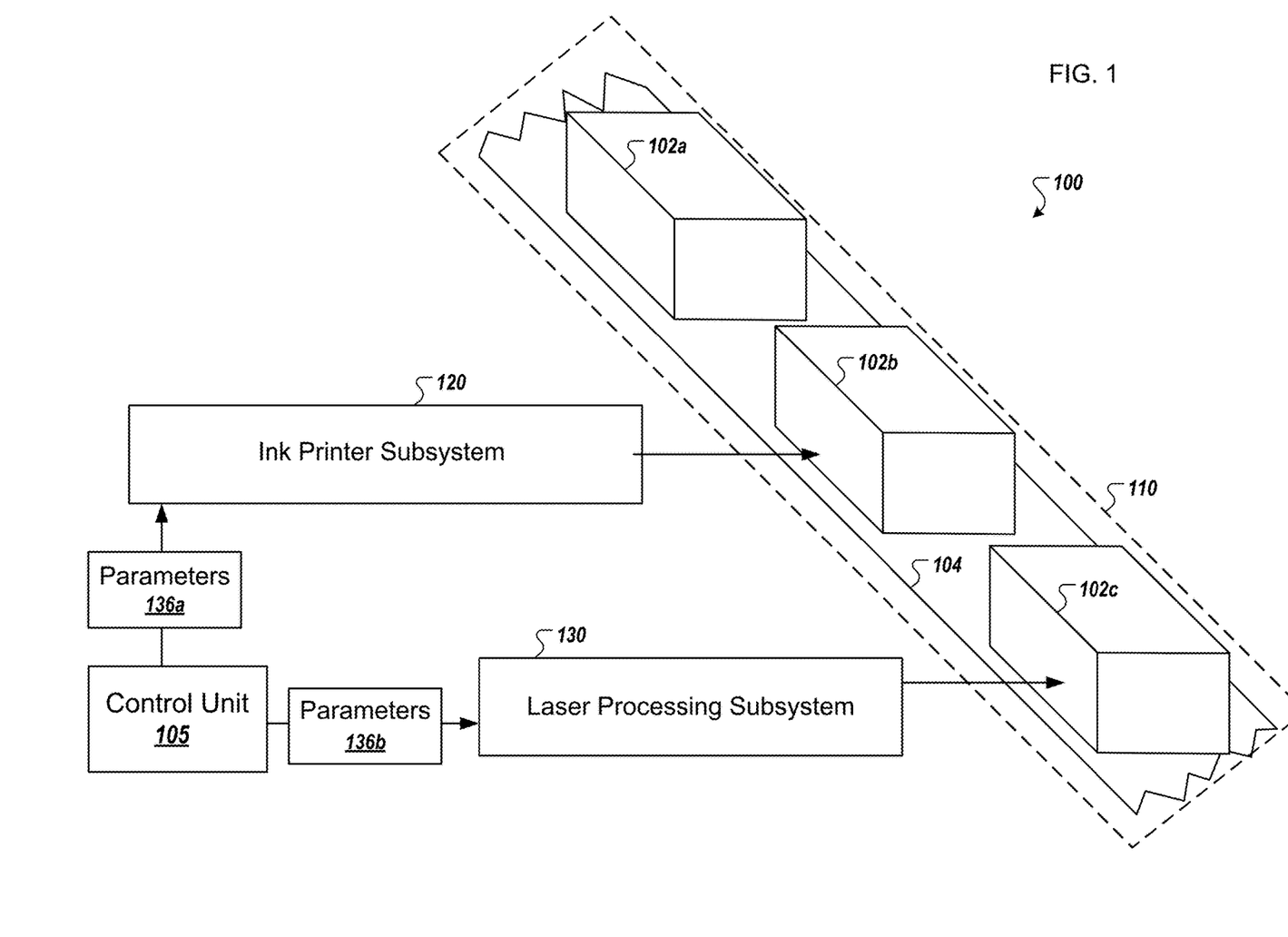
FIG. 1 depicts an example of a system for increasing the rub resistance of labels.

FIG. 1 depicts an example of a system 100 for increasing the rub resistance of labels. The system 100 includes a package conveying subsystem 110, an ink printer subsystem 120, a laser processing subsystem 130, and a control unit 105. The package conveying subsystem 110 conveys packages, e.g., packages 102a, 102b, and 102c, on a conveyor belt 104 or another support structure.

As the packages 102 move along the conveyor belt 104, each of the subsystems acts upon each package 102. The ink printer subsystem 120 prints a symbol on the surface of the package 102. Then, the laser processing subsystem 130 lases the symbol. The control unit 105 communicates with the ink printer subsystem 120 and the laser processing subsystem 130, e.g., electronics of the control unit 105 are coupled to the ink printer subsystem 120 and the laser processing subsystem 130. For example, the control unit 105 can send parameters 136a, e.g., printer parameters, to the ink printer subsystem 120, and parameters 136b, e.g., optical parameters, to the laser processing subsystem 130.

The laser processing subsystem 130 can deliver a laser beam to the surface of the package in a variety of ways. In some implementations, the pattern formed by the laser beam lasing the surface includes linear shapes. Accordingly, the laser processing subsystem 130 can perform beam scanning or a different type of method to create the linear shapes. For example, the laser processing subsystem 130 can employ mechanical beam scanning using a galvometer. An optical lensing system, which can include one or more of an F-theta lens and telecentric lens, can be used with two galvometers, when beam scanning in two dimensions, or with one galvometer, when beam scanning in one dimension. In some implementations, the mechanical beam scanning can utilize a holographic scanner, a (micro-electro-mechanical system) MEMS scanner, or a spinning polygon mirror, e.g., prismatic polygon scanner or a pyramidal polygon scanner.

Other methods of beam scanning are possible. In some implementations, beam scanning can be performed using acousto-optical scanners, which deflect the beam using diffraction. In some implementations, beam scanning can be performed using electro-optic scanners, which deflect the beam using refraction. In some implementations, the laser processing subsystem 130 includes a diffractive optical element (DOE), a piezo mirror scanner, a voice coil mirror scanner, or a combination thereof to generate a line beam.

Figure 2A:
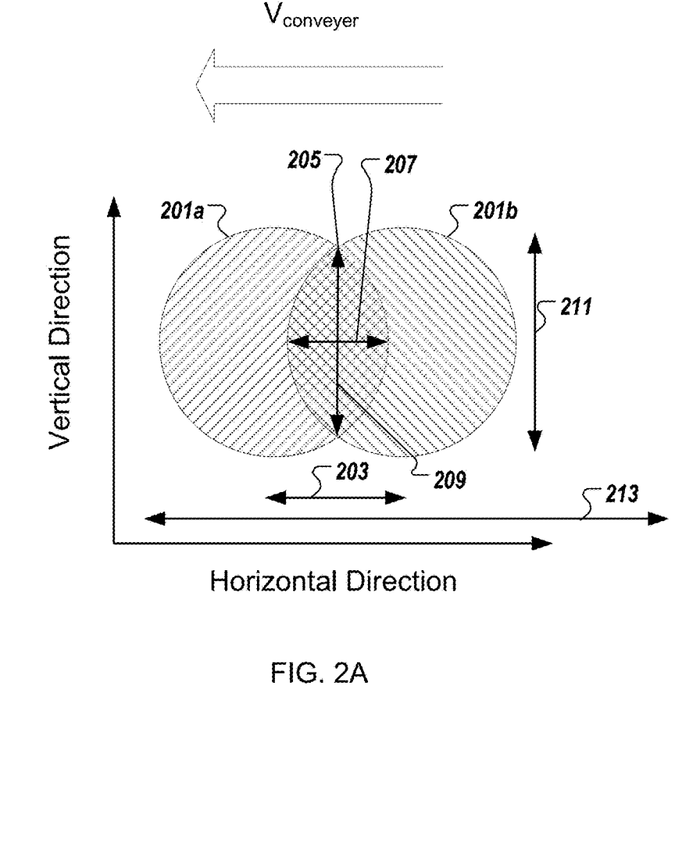
FIGS. 2A and 2B depict the effective beam shape on laser parameters for overlapping profiles of a laser beam.
Figure 2B:
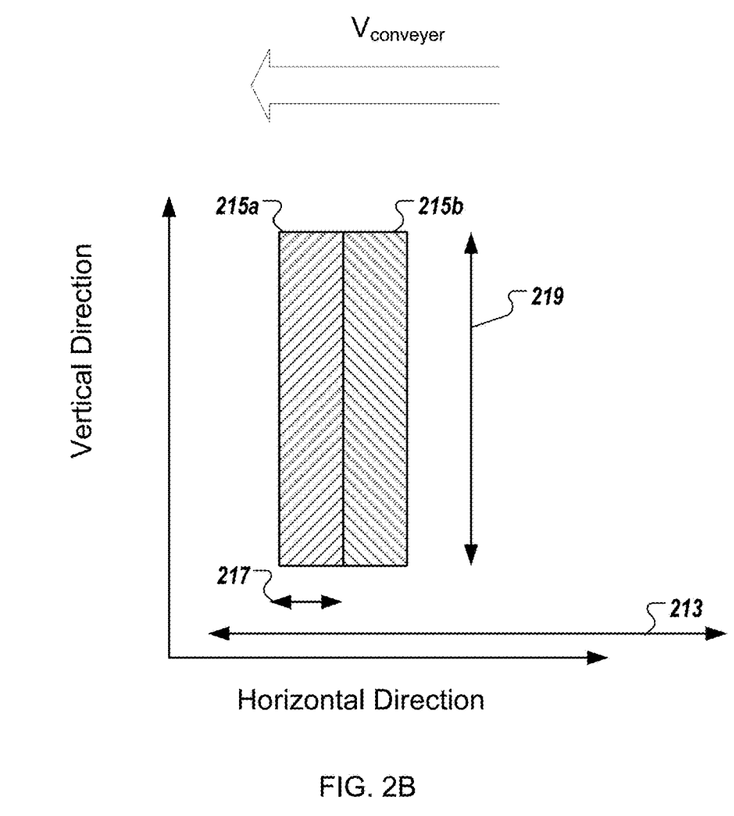

When delivering the laser beam with non-beam scanning methods, other optical components can be used. For a given target fluence, the beam exposure shape and area, e.g., the area of the laser beam when it hits the surface of the package, strongly impacts the required laser power. Generating linear beams, instead of circular beams, can reduce the required laser energy to reach the same target fluence. FIGS. 2A and 2B depict the effect of beam shape on laser parameters for overlapping profiles of a laser beam, e.g., sequential positions of either a pulsed laser or a continuous wave (CW) laser during each dwell time. Depending on the dwell time, laser pulse width, repetition rate, and conveyer speed, the two laser profiles can overlap within a threshold period of time. The dwell time can be selected to be generally lower than the thermal relaxation time of the substrate material. In some implementations, generating a linear beam, instead of a circular beam, can reduce the power required from the laser to reach a target fluence on the package.

In FIG. 2A, two consecutive laser profiles create circular laser beams 201a and 201b, e.g., beams having a circular shape on the surface of the package. In some implementations, circular laser beams 201a and 201b are generated by a laser beam passing through an optical component with positive optical power that expands the beam size while maintaining a circular profile. In some implementations, the dwell time and beam path can be configured to cause regions of the laser beams 201a and 201b to overlap. In some implementations, the energy density of the laser beams 201a and 201b is highest in the center and lowest near the circumference, e.g., follows a Gaussian distribution. The regions that will overlap will have relatively low energy density since those regions are located toward the edge of the laser beams 201a and 201b. Consequently, by overlapping the laser beams 201a and 201b within a certain time period, the optical fluence per unit time can be increased in the overlapping regions.

Depending on the speed of the conveyor belt $V_{conveyer}$, the laser beams 201a and 201b are separated by a distance 203 when encountering the surface of the package, e.g., in the case of one dimensional beam scanning; in the case of two dimensional beam scanning, the distance 203 can depend on both the speed of the conveyor belt and the redirection of the laser beam in the dimension parallel with the direction of the conveyor belt. Although the laser beams 201 and 201b encounter the package at different times, the two laser beams 201a and 201b can have an overlapping area 205. The size of the overlapping area 205, e.g., width 207 and height 209, is determined by distance 203 and the diameter 211 of the two laser beams 201a and 201b.

Generating a linear beam instead of a circular beam can more efficiently use the power of the laser to reach a target fluence, thereby reducing the required power of the laser compared to using a circular beam. For example, for a given target fluence and a pattern width 213 of 15 or 20 mm, the required power of each optical beam is 56 kW for a linear beam and 225 KW for a circular beam.

In FIG. 2B, two consecutive laser profiles that pass through a line generator create line beams 215a and 215b. Depending on the speed of the conveyor belt $V_{conveyer}$, the line beams 215a and 215b can just border each other. The laser source and the line generator can determine the width 217 and height 219 of each line beam. For example, for a given target fluence and a pattern width 213 of 15 or 20 mm, the required power of each line beam is 50 W and 100 W. Consequently, the required laser power can be reduced by using line beams instead of circular beams.

In some implementations, the energy profile of the line beams 215a and 215b include highest energy density at the center and lowest energy density at the top and bottom in the vertical direction. Accordingly, the height 219 can be selected to allow for sufficiently high fluence to lase a region where the symbol will be printed, e.g., the size of the barcode plus or minus a tolerance distance. The area above and below the barcode receiving a lower fluence, e.g., lower than the fluence required to increase the rub resistance of the symbol, will not adversely affect that area.

In some implementations, bleaching a background for a symbol precedes printing the symbol and lasing the symbol. The optical fluence necessary to bleach a portion of the package can be greater than the optical fluence necessary to increase the rub resistance of the printed symbol. For example, the optical fluence used for bleaching can be 0.5-1.0 J/cm$^2$ or 0.5-1.1 J/cm$^2$. It should be appreciated that the range of usable fluence amounts, or a specific fluence amount used, for bleaching the substrate or remelting the ink can be selected in accordance with a given substrate material or a given ink formulation. In some implementations, exposing the printed symbol to a fluence necessary to bleach the package can damage, e.g., ablate, the ink. Accordingly, in some implementations involving bleaching the substrate, bleaching a background occurs before printing the symbol. Alternatively or additionally, bleaching can occur after printing the symbol if the area of the bleached portions of the package corresponds to areas outside of the printed symbol, e.g., bleaching ink satellites between printed bars of a barcode.

Figure 2C:
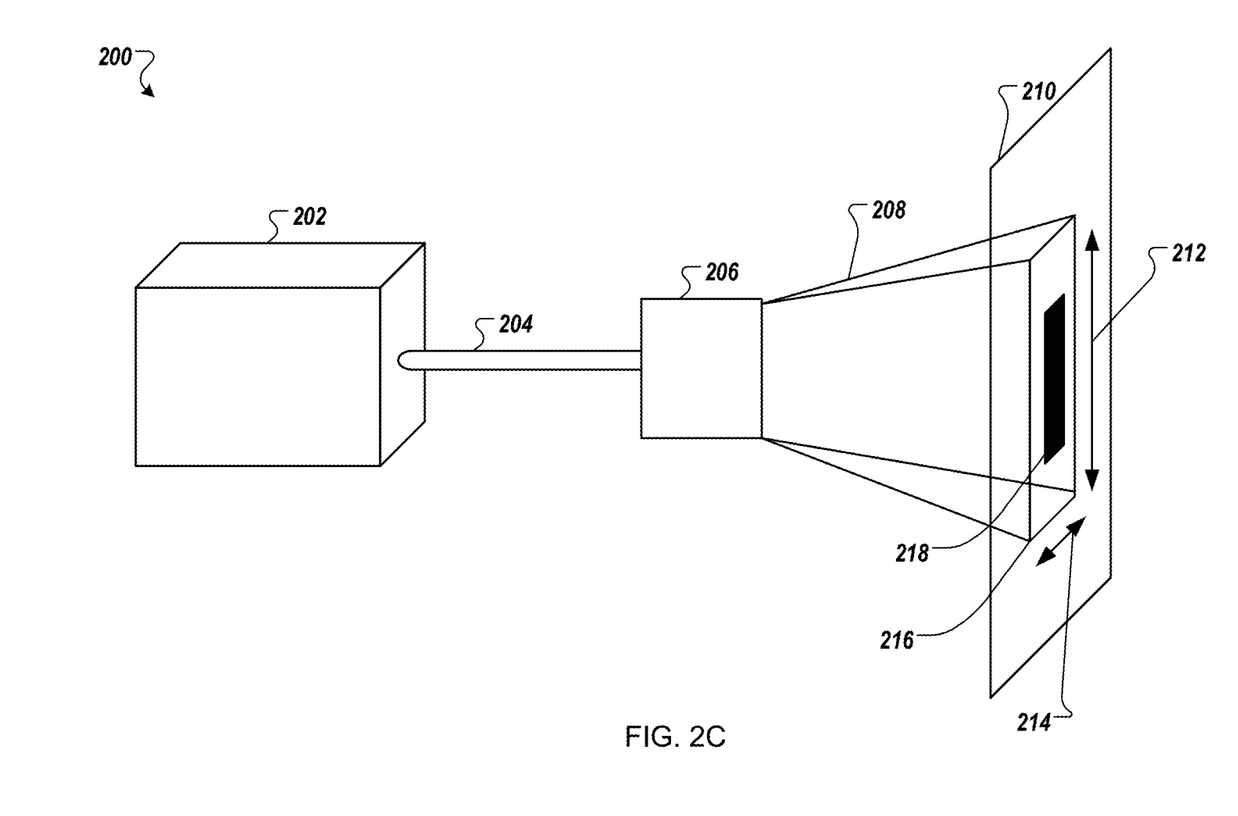
FIG. 2C depicts an example of a laser processing subsystem with a line generator.

FIG. 2C depicts an example of a laser processing subsystem 200 with a line generator 206. The laser processing subsystem 200 can include a laser 202, which generates a circular, collimated laser beam 204. After passing through a line generator 206, the circular, collimated laser beam 204 becomes a line beam 208. The line beam 208 encounters a surface 210, and the projected linear "spot" 216 appears on the surface 210. The size of the beam's area on the surface, e.g., height 212 and width 214, depends on the distance between the line generator 206 and the surface 210, which can be selected to provide a predetermined height and width of line beam 208 at the surface 210. For example, the linear spot 216 can be at least as long as a symbol 218 on the surface 210 along the direction of the height of 212 of the linear spot 216. In some implementations, the direction of the height 212 of the linear spot 216 is perpendicular to the process direction of the printing on the product line, e.g., along the direction of the width 214. In some implementations, the line generator 206 is a Powel lens, a diffractive optical element, an asphere, or another optical element. The height 212 of the projected linear spot 216 can be adjusted as needed, and the height 212 and/or width 214 of the linear spot 216 can depend on the diffraction limit of the components within the line generator 206.

Figure 3:
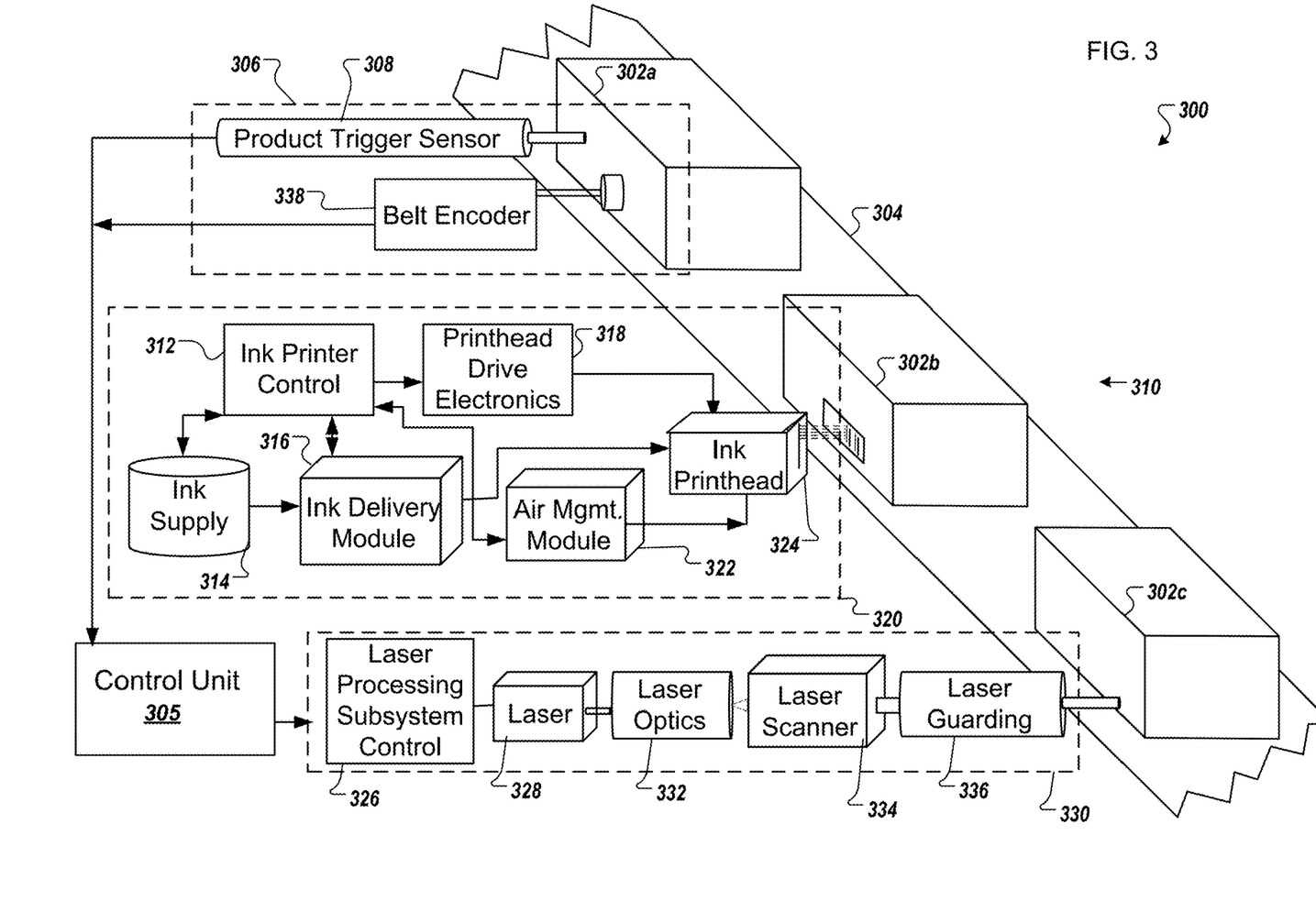
FIG. 3 depicts a system for increasing the resistance of labels.

FIG. 3 depicts a system 300 for increasing the resistance of labels. The system 300 includes an optional characterization subsystem 306, a package conveyance subsystem 310, an ink printer subsystem 320, a laser processing subsystem 330, and a control unit 305. The control unit 305 can send instructions determined by the barcode standards for lasing and printing to the laser processing subsystem 330 and the ink printer subsystem 320, respectively. Note that symbols other than barcodes can also benefit from the present systems and techniques.

The conveyor belt 304 of the package conveyance subsystem 310 can convey packages, e.g., packages 302a-c, along a conveyor belt 304 or other support structure. The conveyer belt 304 has a speed, which control unit 305 can control, or which the control unit 305 is informed of, e.g., through a belt encoder 338.

The optional characterization subsystem 306 can identify the type of each package 102 and measure qualities of the package that will affect the parameters chosen for lasing and printing. The characterization subsystem 306 includes a product trigger sensor 308 and a belt encoder 338. The product trigger sensor 308 can detect the presence of a package.

The belt encoder 338 can measure the speed of the conveyor belt 304. Each of the product trigger sensor 308 and belt encoder 338 can communicate data to the laser processing subsystem control 326 and the control unit 305. The control unit 305 can send, among other things, data from the characterization subsystem 306 to the ink printer subsystem 320.

The ink printer subsystem 320 can print a symbol on a first portion of the surface of a package. Ink printer control 312 can communicate with ink supply 314, ink delivery module 316, printhead drive electronics 318, and air management module 322. The ink supply 314 can send information about ink supply to the ink delivery module 316. The printhead drive electronics 318, ink delivery module 316, and air management module 322 can send instructions to an ink printhead 324, which can print a symbol on the surface of a package using ink. In some implementations, the ink printer subsystem 320 is an ink-based printer, such as a hot melt piezoelectric printer. Other types of ink-based printers can also be used, including printers that do not use hot melt inks.

The laser processing subsystem 330 can lase a second portion of the surface of a package. In some implementations, the first portion corresponding to the printed symbol and the second portion corresponding to lasing are identical. In other implementations, the first and second portions are not identical, e.g., the lased region is greater than and completely encompasses the printed symbol. The laser processing subsystem 330 includes a laser 328. In some implementations, the laser is a $CO_2$ laser that generates a laser with a wavelength of about 9.3 microns. In this specification, about means±1%, ±0.5%, or ±0.1% of the specified value, depending on the implementation. For example, the wavelength of the laser can be about 9.3, e.g., 9.3±0.01 micron. Other lasing wavelengths can be used in various implementations, such as a laser system that operates at another lasing wavelength that has equal or greater absorption properties. In general, the optical power needed for a given system will depend on the absorption of the substrate and the required marking speed. In some implementations, the laser is a universal laser for polymeric material processing.

The laser processing subsystem control 326 can include software and a computer, which can control parameters of the laser 328. The one or more parameters can include a spot dwell time, a distance between spot dwells, laser power, laser wavelength, or a combination thereof. The combination of parameters can determine a projected spot of the laser beam, which affects an optical fluence of the laser beam.

The required optical power during lasing can depend on the absorptive qualities of the substrate and ink and the marking speed. The laser processing subsystem 330 can change the power settings of the laser as needed, e.g., increase or decrease the percentage of total possible power. For example, the power of the laser when remelting ink can be about 7 Watts, and the power to bleach a portion of the surface of a package can be 20 Watts. In some implementations, the print speed can determine the required optical power.

The laser processing subsystem 330 includes an optical assembly, e.g., laser 328, laser optics 332, and laser scanner 334. A laser beam generated by the laser 328 can pass through laser optics 332 to produce a beam with a target profile. Then the laser beam can pass through the laser scanner 334, which directs the beam toward a package. In some implementations, laser scanner 334 includes a beam director, e.g., a galvometer, a micro-electro-mechanical system (MEMs), a rotating polygonal mirror, etc., arranged to scan the laser beam onto a package along a controlled path. In some implementations, no laser scanner 334 is used, since the target profile generated by the laser optics 332 can span the entire height of the symbol. In some implementations, laser guarding 336 is shaped to prevent laser light from exiting the laser processing subsystem 330 at an angle that would allow the laser light to hit a person's eye, to not allow a person to put a hand in the trajectory of the laser, or both. In some implementations, there is at least a 30% overlap of the projected spot of the laser beam on the surface of the package as the laser processing subsystem 330 scans the projected spot of the laser beam on the surface of the package. In some implementations, the laser beam has an infrared wavelength, and the controlled path includes between 30% and 56% overlap of the projected spot of the infrared laser beam as the laser scanner 334 scans the projected spot of the infrared laser beam on the surface of the package.

In some implementations, the control unit 305 includes an alignment subsystem that uses information about the system 300 to determine instructions for ink printer subsystem 320 and the laser processing subsystem 330 that lead to proper alignment. For example, the alignment subsystem can use a "dead reckoning" technique to ensure proper alignment, e.g., ensuring that the area corresponding to lasing completely overlaps with the printed symbol. In the example of a barcode, which is composed of a series of rectangular ink marks, dead reckoning includes measuring a separation between the point where the laser beam encounters a package and the point where ink from the ink printhead 324 reaches the package. Dead reckoning tends to produce accurate results when the separation remains a predetermined fixed value, the separation can be measured to the accuracy of a pixel or less, and when the packages do not jostle much from the ink printer subsystem 320 to the laser processing subsystem 330.

A second method of alignment includes using a registration mark, e.g., a crosshairs or bullseye that has been preprinted on a predetermined location of each package. The ink printer subsystem 320 can mark the package with the registration mark, e.g., the registration mark being closer to the laser processing subsystem 330 compared to the symbol. An imaging camera on the laser processing subsystem 330 can detect the registration mark with accuracy of less than a pixel. The laser processing subsystem 330 can be calibrated to begin lasing a predetermined number of pixels from the registration mark. This method of alignment does not depend on the distance between the ink printer subsystem 320 and laser processing subsystem 330.

A third method of alignment is configuring the laser processing subsystem 330 to track the pattern produced by the ink printer subsystem 320. The third method of alignment does not depend on the distance between the laser processing subsystem 330 and ink printer subsystem 320. Additionally, the third method allows for the laser processing subsystem 330 to bleach any ink satellites, e.g., spurious micro-droplets created while ink printing. For example, in a two dimensional scanner implementation, the laser beam spot can be scanned over an area containing both ink and non-ink portions, and the laser fluence can be increased (e.g., by increasing the laser power and/or dwell time) in the non-ink portions of the area (thereby bleaching the substrate portions outside of the symbol, including any ink satellites) and the laser fluence can be decreased (e.g., by decreasing laser power and/or dwell time) in the ink portions of the area (thereby increasing rub resistance for the ink). Thus, the readability of the symbol can be increased at the same time as the durability of the symbol is increased.

Figure 4:
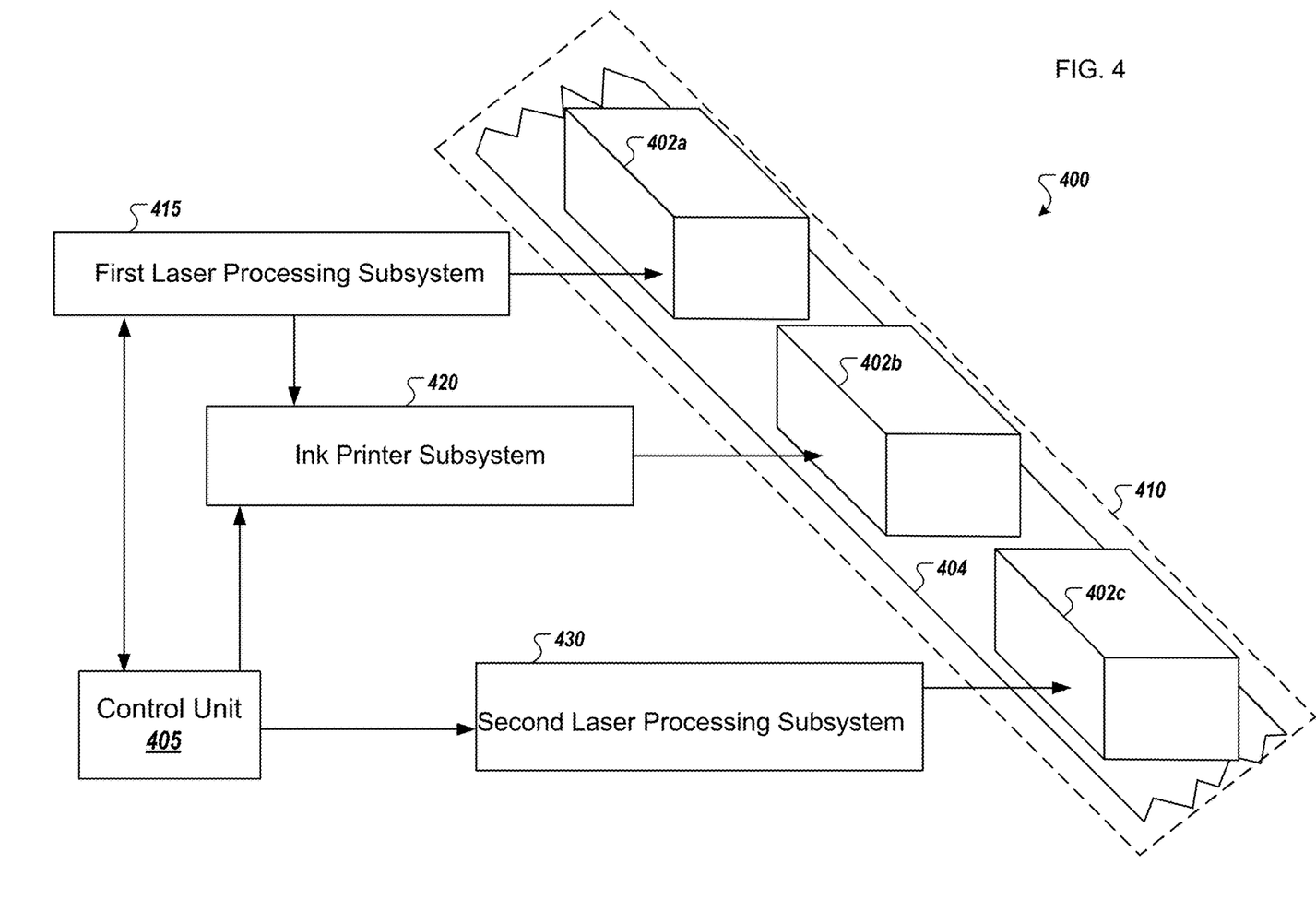
FIG. 4 depicts an example of a system with two laser processing subsystems.

FIG. 4 depicts an example of a system 400 with a first and second laser processing subsystems 415 and 430. Similarly to FIG. 3, a package conveying system 410 conveys packages, e.g., packages 402a, 402b, and 402c, on a conveyor belt 404 or another support structure. Optionally, system 400 includes a characterization subsystem.

The description for the characterization subsystem, a laser processing subsystem 330, and ink printer subsystem 320, and a control unit 305 applies to the second laser processing subsystem 430, the ink printer subsystem 420, and the control unit 405, respectively.

In some implementations, the first laser processing subsystem 415 pre-lases a portion of a surface of a package to create a bleached background. The first laser processing subsystem 415 can be similar to the second laser processing subsystem 430, except that the parameters and optical components are chosen to bleach a portion of the package rather than to lase the printed symbol.

Then, the ink printer subsystem 420 can print a symbol on top of the bleached background. Then the second laser processing subsystem 430 can lase the printed symbol to increase the rub resistance of the symbol.

In some implementations, the second laser processing subsystem 430 can lase satellites, e.g., accidental ink marks in the bleached background. The laser parameters used by the second laser processing subsystem 430 can be different for lasing the printed symbol to increase rub resistance and lasing satellites.

In some implementations, the first laser processing subsystem 415 characterizes a package using a laser and sends information regarding the package to the control unit 405.

Figure 5A:
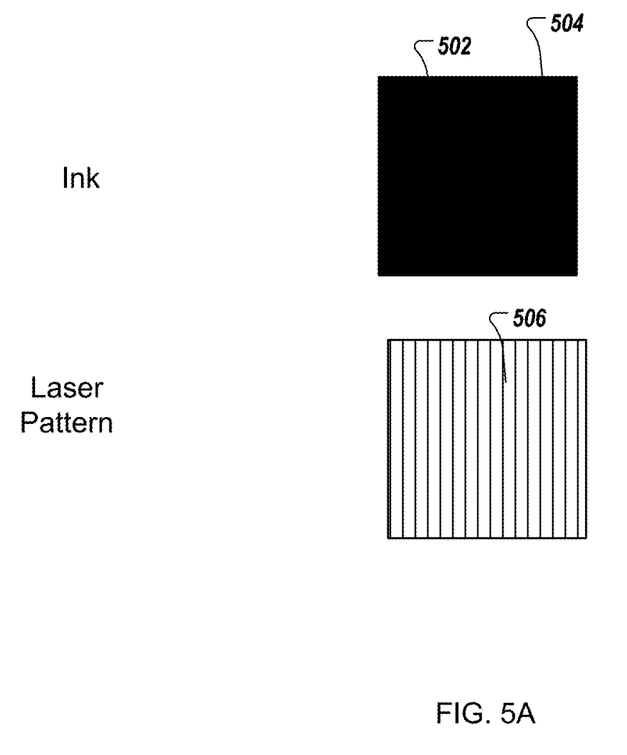
FIGS. 5A and 5B depict schematics of examples of ink and laser patterns.
Figure 5B:
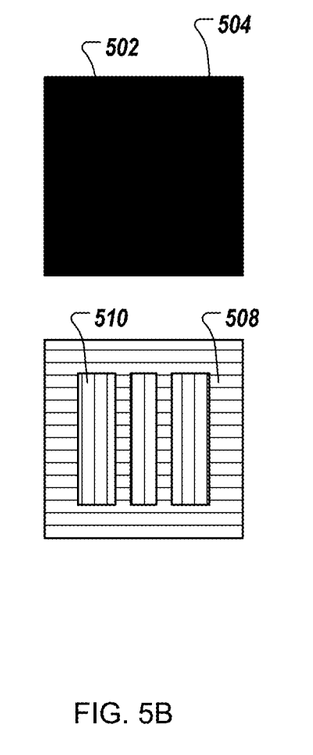

In some implementations, printing and lasing the symbol can follow the patterns disclosed in the description relating to FIGS. 5A and 5B, which depict schematics of examples of ink and laser patterns. In the examples of 5A and 5B, the material being bleached and printed upon can be brown corrugate. The symbol of printing, e.g., the ink pattern, can be a data-encoding symbol (e.g., a barcode) that achieves a B-grade as a result of the systems and techniques described in this application.

The top row of FIGS. 5A and 5B depict an ink pattern 502, e.g., a barcode or other symbol, on the material 504. The second row of FIGS. 5A and 5B depicts a laser patterns for first through third regions 506, 508, and 510.

In FIG. 5A, the laser pattern of the first region 506 has a uniform, low fluence, e.g., 0.4-0.5 J/cm$^2$, (indicated by vertical lines) field. For example, the laser processing subsystems 330 and 430 can lase the ink pattern 502 printed symbol as well as the area surrounding the printed symbol. The dwell time in the first region 506 can be, for example, 1 to 30 microseconds, with the power level set at 35% of the maximum power output (e.g., as controlled with the laser's duty cycle). At this power setting, a dwell time of 18 microseconds can deliver about 0.4 J/cm$^2$ of optical fluence, and a dwell time of 22 microseconds can deliver about 0.5 J/cm$^2$ of optical fluence. But note that other optical fluence ranges (e.g., 0.4-1.0 J/cm$^2$) are possible, depending on the ink being used and the nature of the substrate.

In some implementations, the first laser processing subsystem 415 lases the first region 506 or third region 510, with either high or low fluence settings, which can cause bleaching or warming, respectively. Note that pre-warming the area that is going to be printed can further improve the rub resistance of the symbol after the symbol is lased by the second laser processing subsystem 430. The ink printer subsystem 420 prints a symbol corresponding to the ink pattern 502 on the pre-lased portion of the package, and the second laser processing subsystem 430 can lase, using low fluence settings, the first region 506 or the third region 510 corresponding only to the ink pattern 502, thereby increasing the rub resistance of the ink. Optionally, the second laser processing subsystem 730 can also lase, with high fluence settings, second region 508.

In FIG. 5B, the second region 508 receives uniform, high fluence, e.g., 0.5-1.0 J/cm$^2$, radiation and the third region 510 receives uniform, low fluence (indicated by vertical lines) radiation. For example, using the same laser as in the example above, the dwell time in the second region 508 can be about 15 microsecond (e.g., 14-16 microseconds) with the power level set at 100% of the maximum power output (e.g., as controlled with the laser's duty cycle). At this power setting, a dwell time of 15 microseconds can deliver about 0.946 J/cm$^2$ of optical fluence.

In some implementations, the order of lasing and printing in FIG. 5B is as follows. First, the ink printer subsystem 320 from system 300 can print ink pattern 502. Then, the laser processing subsystem 330 can lase the third region 510 at first laser settings. The first laser settings can include a dwell time of 18 to 22 microseconds and the power level set at 35% of the maximum power output. Optionally, the laser processing subsystem 330 can also lase the second region 508 at second laser settings. The second laser settings can include a dwell time of about 15 microsecond (e.g., 14-16 microseconds) and the power level set to at least 90%, e.g., 100%, of the maximum power output. Lasing the first and second regions can occur in either order.

In some implementations, the order of lasing and printing in FIG. 5B is as follows. First, the first laser processing subsystem 415 from system 400 can lase the second region 508 with high fluence. Lasing the first region of the package can cause that region to bleach. Second, the ink printer subsystem 420 from system 400 can print ink pattern 502, such that the ink pattern is aligned with the empty regions of the second region 508. Third, the second laser processing subsystem 430 from system 400 can lase the third region 510, which can increase the rub resistance of the printed symbol. The dwell time of the laser on the third region 510 can be, for example, 18 to 22 microseconds with a 35% of max power setting. The dwell time of the laser on the second region 508 can be, for example, about 15 microseconds, e.g., 14 to 16 microseconds, with a 100% of max power setting.

Figure 6:
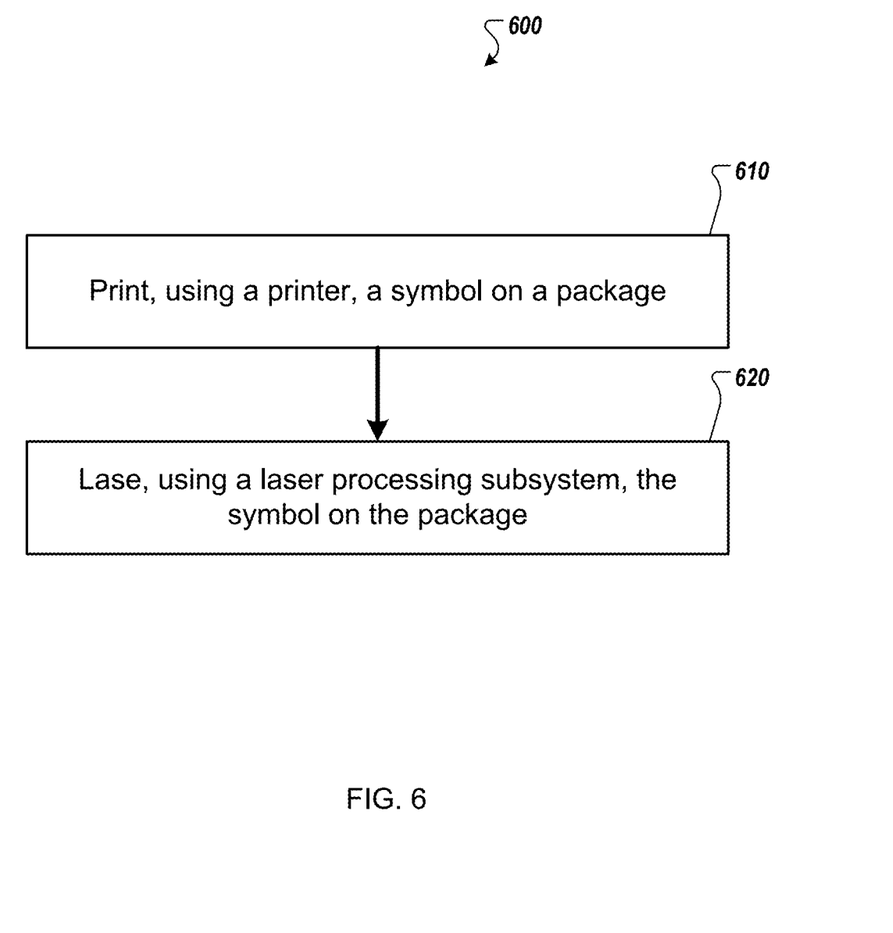
FIG. 6 depicts an example of the method of increasing the rub resistance of labels.

FIG. 6 depicts an example of the method 600 of increasing the rub resistance of labels. Systems 300 and 400, for example, can perform the method 600.

A printer, e.g., ink printer subsystem 320 or 420, can print a symbol on a package (610). For example, a hot melt piezoelectric printer can print a barcode formed by hot melt ink onto a package. The package can be moving in a package conveyance subsystem, where a conveyer belt transports packages.

A laser processing subsystem, e.g., laser processing subsystems 330 and 430, can lase the symbol on the package, thereby increasing the rub resistance of the package (620). For example, lasing the barcode under the appropriate fluence can improve ink coverage on a package, improve darkness of the ink, and increase the rub resistance of the barcode, decreasing the likelihood of ink in the symbol rubbing to undesired portions of the package.

In some implementations, lasing the symbol of the package includes lasing, at a low fluence, an area corresponding to both the symbol and a subarea surrounding the symbol, e.g., first region 506. In some implementations, lasing the symbol of the package includes lasing, at a low fluence, an area corresponding to only the symbol, e.g., third region 510.

In some implementations, the method 600 can include additional steps, fewer steps, or some of the steps can be divided into multiple steps. For example, in some implementations, the laser processing subsystem lases, at a low fluence, either first or third regions 506 and 510 before printing the symbol in order to pre-warm the substrate before the ink is applied.

In some implementations, the laser processing subsystem lases, at a high fluence, either the first or second regions 506 and 508 before printing the symbol. In some implementations, the laser processing subsystem lases, at a high fluence, the second region 508 after printing the symbol.

Figure 7:
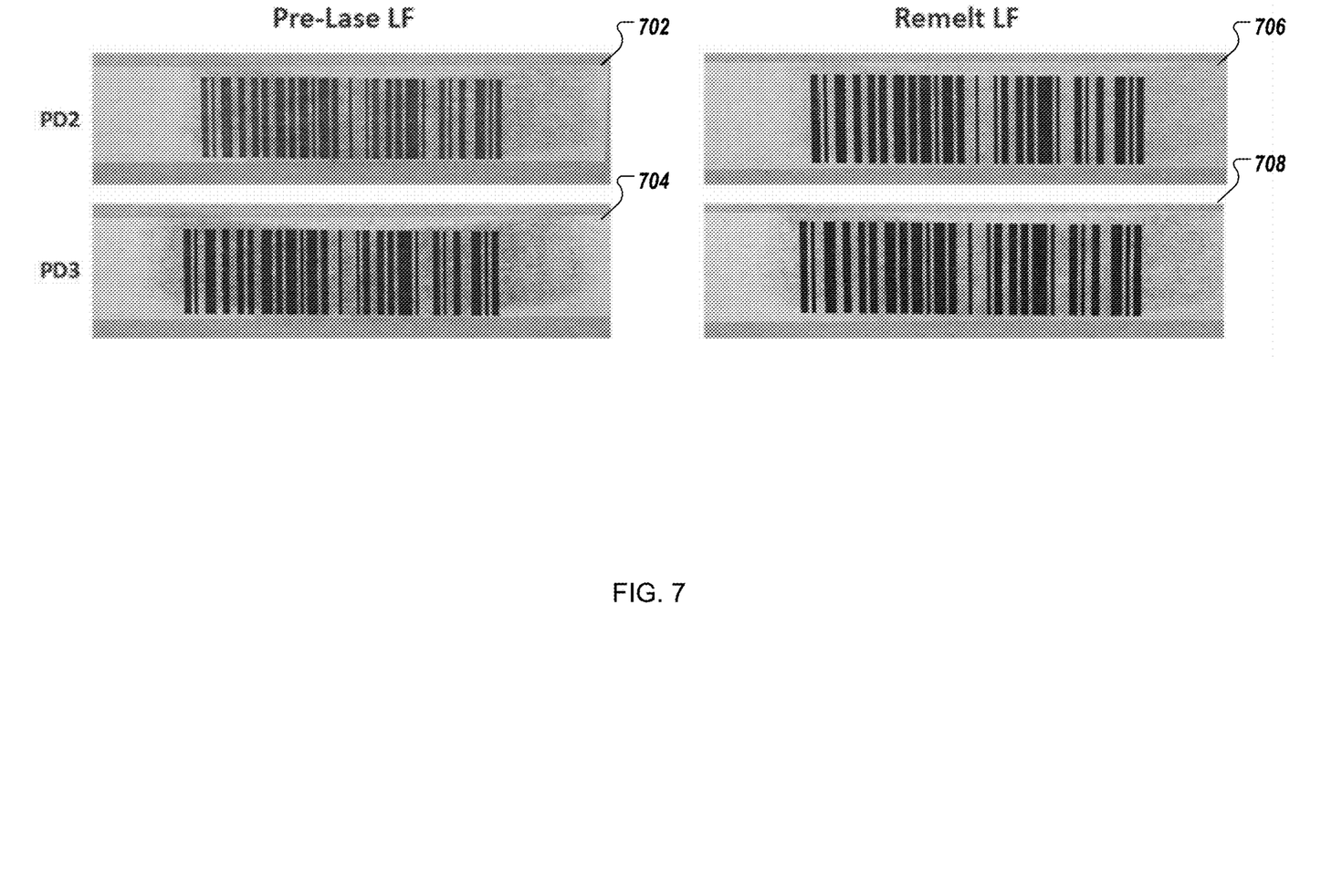
FIG. 7 is an image displaying the appearance of rubbed labels printed under different conditions.

FIG. 7 is an image displaying the appearance of rubbed an ink label, e.g., MARKEM-IMAJE® series 5855 ink label rubbed 400 times, printed under different conditions. Other inks, such as MARKEM-IMAJE® series 5005, 5055, and 5805, can behave similarly after being rubbed. FIG. 7 includes barcodes 702, 704, 706, and 708 printed on different packages. Barcodes 702 and 706 have a first print density, e.g., 200 dots per inch (DPI), and barcodes 704 and 708 have a second print density greater than the first print density, e.g., 300 DPI in the process direction. The first and second print densities can have the same DPI along the cross process direction, e.g., 100 DPI. A laser processing subsystem lased, at a low fluence, the area corresponding to barcodes 702 and 704 before an ink printer subsystem printed the barcode onto each package. A laser processing subsystem lased the area corresponding to barcodes 706 and 708 after an ink printer subsystem printed the barcode onto each package.

As can be seen by comparing barcodes 702 and 704 to barcodes 706 and 708, the ink from the printed barcodes was less resistant to rubbing, e.g., ink from the barcodes smeared onto the background area, for the barcodes that were not lased after printing. Lasing the barcode after printing the barcode improves the rub resistance for both examples of print densities in FIG. 7.

The effect of improved rub resistance can be quantified, as well. Rub resistance can describe how much a symbol will deteriorate in quality as the rub count increases. A single rub can be a complete sweep back and forth of a weight in an automatic rubbing apparatus. Table 1 depicts how the barcode grade of printed barcodes changes over the course of 400 rubs for two types of ink, e.g., MARKEM-IMAJE® series 5005/5805 and 5055/5855 inks, under different conditions, e.g., pre-lasing the area corresponding to the barcode with a low fluence or remelting the ink corresponding to the barcode with a low fluence.

TABLE 1

| Rub Count | 5805 Pre-Lase LF | 5805 Remelt LF | 5855 Pre-Lase LF | 5855 Remelt LF |
| --- | --- | --- | --- | --- |
| 0 | Grade C | Grade C | Grade C | Grade B |
| 100 | Grade C | Grade C | Grade D | Grade C |
| 200 | Grade D | Grade C | Grade D | Grade C |
| 400 | Grade D | Grade C | Grade D | Grade C |

The data in Table 1 shows that a barcode formed by 5805 ink and printed on a pre-lased area at a low fluence begins at Grade C and deteriorates to Grade D after 200 rub counts. A barcode formed by 5805 ink and remelted at a low fluence begins at Grade C maintains a Grade C quality after 400 rub counts. A barcode formed by 5855 ink and printed on an area pre-lased at a low fluence begins at Grade C and deteriorates to Grade D after 100 rub counts. A barcode formed by 5855 ink and remelted at a low fluence begins at Grade B, deteriorates to Grade C quality after 100 rub counts, and maintains a Grade C quality at 400 rub counts. In general, the symbols that were remelted have a higher final grade score compared to the symbols printed on a pre-lased area.

Low rub resistances of printed barcodes can lead to low barcode quality after rubbing, as there is decreased contrast between the background and the printed symbol. If rub resistance is high, on the other hand, the symbol contrast, e.g., the difference between the maximum and minimum reflectances of the background and the ink, remains more stable. Table 2 includes minimum and maximum reflectances and symbol contrast for barcodes printed with MARKEM-IMAJE® series 5055/5855 ink at the first print density (PD2) under various conditions, e.g., no lasing the area corresponding to the printed symbol, pre-lasing the area corresponding to the printed symbol with either a high fluence ("HF," 0.5-1 J/cm$^2$) or low ("LF," 0.4-0.5 J/cm$^2$) fluence, lasing the printed symbol, e.g., remelting, with a low fluence, or a combination thereof. The values in Table 2 are averaged over five samples, with three measurements taken for each sample.

TABLE 2

| PD2 | Min. Reflectance | Max. Reflectance | Symbol Contrast |
| --- | --- | --- | --- |
| No Lasing | 9.0 | 47.5 | 37.8 |
| Pre-Lase HF | 13.0 | 58.1 | 44.5 |
| Pre-Lase LF | 11.8 | 54.3 | 42.2 |
| Remelt LF | 4.6 | 53.7 | 48.6 |
| Pre-Lase HF & Remelt LF | 7.6 | 58.5 | 50.4 |

The data in Table 2 indicates that remelting symbols formed by hot melt ink at the first print density leads to increased symbol contrast, especially when combined with pre-lasing the area corresponding to the symbol. The increased rub resistance from lasing the symbol can lead to a more stable symbol contrast after rubbing.

Table 3 includes minimum and maximum reflectances and symbol contrast for barcodes printed with MARKEM-IMAJE® series 5055/5855 ink at the second print density (PD3) under various conditions, e.g., no lasing the area corresponding to the printed symbol, pre-lasing the area corresponding to the printed symbol with either a high fluence ("HF," 0.5-1 J/cm$^2$) or low ("LF," 0.4-0.5 J/cm$^2$) fluence, lasing the printed symbol with a low fluence, or a combination thereof. The values in Table 3 are averaged over five sample, with three measurements taken for each sample.

TABLE 3

| PD3 | Min. Reflectance | Max. Reflectance | Symbol Contrast |
| --- | --- | --- | --- |
| No Lasing | 4.8 | 47.9 | 42.6 |
| Pre-Lase HF | 7.6 | 58.2 | 50.0 |
| Pre-Lase LF | 6.2 | 54.2 | 47.6 |
| Remelt LF | 3.0 | 53.5 | 50.1 |
| Pre-Lase HF & Remelt LF | 5.0 | 57.6 | 52.1 |

The data in Table 3 indicates that remelting symbols formed by hot melt ink at the second print density leads to increased symbol contrast, especially when combined with pre-lasing the area corresponding to the symbol. The increased rub resistance from lasing the symbol can lead to the symbol contrast remaining high after rubbing.

Pre-lasing at a low fluence can improve the quality of the barcode compared to barcodes prepared with no lasing, as Table 4 indicates. Table 4 includes the final grade of barcodes formed with different inks, different print densities, and different lasing conditions.

TABLE 4

| | 5805 | | 5855 | |
| --- | --- | --- | --- | --- |
| | PD2 | PD3 | PD2 | PD3 |
| No Lasing | Grade C | Grade C | Grade C | Grade C |
| Pre-Lase LF | Grade C | Grade C | Grade C | Grade B |
| Remelt LF | Grade C | Grade B | Grade B | Grade B |

In the above example, barcodes treated with no lasing consistently have a Grade C barcode quality, no matter the print density or type of ink used. Symbols printed on pre-lased areas have a Grade C quality for 5805 ink with both print densities and 5855 ink with the first print density and a Grade B quality for 5855 ink at the second print density. Remelted barcodes have a Grade C quality for 5805 ink for the first print density and Grade B quality for 5855 a first both the first and second print densities. In general, the barcode quality of remelted symbols is equal to or greater than the barcode quality for symbols printed on a pre-lased area and barcodes treated with no lasing. In general, the barcode quality of pre-lased symbols is equal to or greater than the barcode quality of symbols treated with no lasing.

Figure 8:
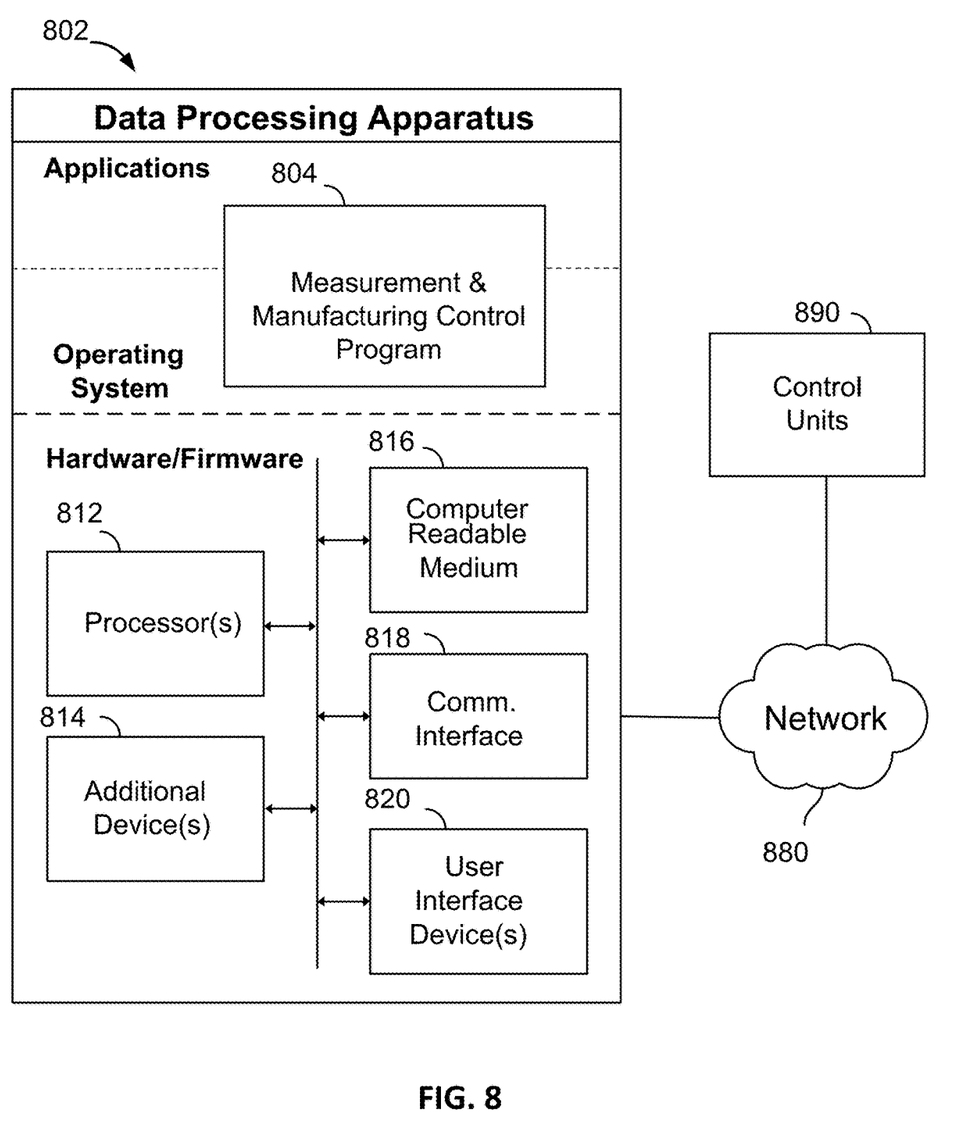
FIG. 8 is a schematic diagram of a data processing system usable to implement the described systems and techniques.

FIG. 8 is a schematic diagram of a data processing system including a data processing apparatus 802 which can be programmed as a client or as a server. The data processing apparatus 802 is connected with one or more controller units 890 through a network 880. The data processing apparatus 802 is a computing system that interfaces with and manages the operation of one or more control units 890, e.g., control units 105, 305, and 405. The one or more control units interfacing with the data processing apparatus 802 can control laser processing subsystems 330, 415, and 430, ink printer subsystems 320 and 420 in a production, packaging, and/or distribution facility/site.

While only one computer is shown in FIG. 8 as the data processing apparatus 802, multiple computers can be used. The data processing apparatus 802 includes various software, firmware and/or hardware modules, which can be distributed between an applications layer and an operating system. These can include executable and/or interpretable software programs or libraries, firmware and/or hardware components, including tools and services of a measurement and manufacturing control program 804 that implement the systems and techniques described above. The number of modules used can vary from one implementation to another. Moreover, the modules can be distributed on one or more data processing apparatus connected by one or more computer networks or other suitable communication networks.

The data processing apparatus 802 also includes hardware or firmware devices including one or more processors 812, one or more additional devices 814, a computer readable medium 816, a communication interface 818, and one or more user interface devices 820. Each processor 812 is capable of processing instructions for execution within the data processing apparatus 802. In some implementations, the processor 812 is a single or multi-threaded processor. Each processor 812 is capable of processing instructions stored on the computer readable medium 816 or on a storage device such as one of the additional devices 814. The data processing apparatus 802 uses the communication interface 818 to communicate with one or more control units 890, for example, over the network 880. Examples of user interface devices 820 include a display; camera; speaker; microphone; tactile feedback device; keyboard; mouse; and VR and/or AR equipment. The data processing apparatus 802 can store instructions that implement operations associated with the program(s) described above, for example, on the computer readable medium 816 or one or more additional devices 814, for example, one or more of a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application-specific integrated circuit (ASIC).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions, and one or more memory devices for storing instructions and data. Generally, a computer will also include, or be operatively coupled to receive data from, or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including: semiconductor memory devices (e.g., Erasable Programmable Read-Only Memory (EPROM) and Electrically Erasable Programmable Read-Only Memory (EEPROM); flash memory devices; magnetic disks (e.g., internal hard disks or removable disks); magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a liquid crystal display (LCD), an organic light emitting diode (OLED), or another monitor for displaying information to the user, and a keyboard and a pointing device, e.g., a mouse or a trackball, by which the user can provide input to the computer. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., a data server, or that includes a middleware component, e.g., an application server, or that includes a front-end component, e.g., a client computer having a graphical user interface or a web browser through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately, or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims.

What is claimed is:

1. A system comprising:
a printer configured and arranged to form a symbol on a surface of a material using hot melt ink;
a laser processing subsystem comprising a laser and an optical assembly; and
electronics communicatively coupled with the printer and the laser processing subsystem, the electronics being configured to generate a laser beam from the laser and convey the laser beam, using the optical assembly, onto an area encompassing at least the hot melt ink forming the symbol, thereby increasing rub resistance of the hot melt ink on the surface of the material by remelting the hot melt ink forming the symbol.

2. The system of claim 1, wherein the electronics are configured to control one or more parameters of the laser, the optical assembly, or both, to adjust an optical fluence of the laser beam based on the hot melt ink.

3. The system of claim 2, wherein a wavelength of the laser is 9.3 µm, and a fluence of the laser when the laser encounters the hot melt ink of the symbol is in a range of 0.4-0.5 J/cm$^2$.

4. The system of claim 2, wherein the electronics are configured to use a same optical fluence in both regions of the hot melt ink forming the symbol and regions of the surface outside of the hot melt ink forming the symbol.

5. The system of claim 2, wherein the optical assembly comprises a line generator configured and arranged to shape the laser beam into a line that is at least as long as the symbol along a direction perpendicular to a process direction.

6. The system of claim 1, wherein the optical assembly comprises a beam director arranged to scan a projected spot of the laser beam onto the surface of the material along a controllable path.

7. The system of claim 6, wherein a dwell time of the laser on the hot melt ink forming the symbol is in a range of 1-30 microseconds at a power level setting that results in a fluence amount selected in accordance with a given ink formulation for the hot melt ink of the symbol.

8. The system of claim 7, wherein a dwell time of the laser on the surface outside of the hot melt ink forming the symbol is between 14 and 16 microseconds at a power level setting that is at least 90% of the maximum power level for the laser.

9. The system of claim 7, wherein the electronics are configured to cause the laser to lase the hot melt ink forming the symbol before lasing the surface outside of the hot melt ink forming the symbol.

10. A system comprising:
a printer configured and arranged to form a symbol on a surface of a material using hot melt ink;
a laser processing subsystem comprising a laser and an optical assembly; and
electronics communicatively coupled with the printer and the laser processing subsystem, the electronics being configured to generate a laser beam from the laser and convey the laser beam, using the optical assembly, onto at least the hot melt ink forming the symbol, thereby increasing rub resistance of the hot melt ink on the surface of the material, wherein the optical assembly comprises a beam director arranged to scan a projected spot of the laser beam onto the surface of the material along a controllable path, and wherein the electronics are configured to use a first optical fluence on the hot melt ink forming the symbol and use a second optical fluence used on the surface outside of the hot melt ink forming the symbol, the first optical fluence being lower than the second optical fluence.

11. The system of claim 10, wherein the electronics are configured to lase with the first optical fluence at least an area of the surface in which the symbol will be located, before the printer forms the symbol on the surface of the material using the hot melt ink.

12. The system of claim 1, wherein the electronics are configured to cause the laser to lase an area of the surface in which the symbol will be located, before the printer forms the symbol on the surface of the material using hot melt ink.

13. The system of claim 1, wherein a print density of the symbol is 100 dots per inch or more.

14. A method of increasing rub resistance of a printed symbol:
   printing, using a printer, a symbol formed by hot melt ink on a package; and
   lasing, using a laser, an area encompassing at least the hot melt ink forming the symbol on the package, wherein a rub resistance of the symbol increases as a result of being lased by remelting the hot melt ink forming the symbol.

15. The method of claim 14, wherein lasing the symbol comprises lasing an area encompassing only the symbol.

16. The method of claim 14, wherein lasing the symbol comprises lasing an area encompassing the symbol and an area surrounding the symbol.

17. The method of claim 14, wherein a dwell time of the laser on the hot melt ink forming the symbol is in a range of 1-30 microseconds at a power level setting that results in a fluence amount selected in accordance with a given ink formulation for the hot melt ink of the symbol.

18. The method of claim 17, wherein a dwell time of the laser on a surface outside of the hot melt ink forming the symbol is between 14 and 16 microseconds at a power level setting that is at least 90% of the maximum power level for the laser.

19. The method of claim 14, wherein lasing the symbol on the package comprises lasing the symbol with a laser line that is at least as long as the symbol along a direction perpendicular to a process direction.

20. The method of claim 14, further comprising lasing, before printing the symbol, an area of the package encompassing where the printer prints the symbol.

21. The method of claim 2, wherein the electronics are configured to control one or more parameters of the laser, the optical assembly, or both, to adjust the optical fluence of the laser beam to a first optical fluence for a first type of hot melt ink and to a second, different optical fluence for a second type of hot melt ink.

* * * * *